Aug. 9, 1932.   W. A. DOREY   1,870,241
LUMINAIR
Filed Aug. 14, 1931   5 Sheets-Sheet 3
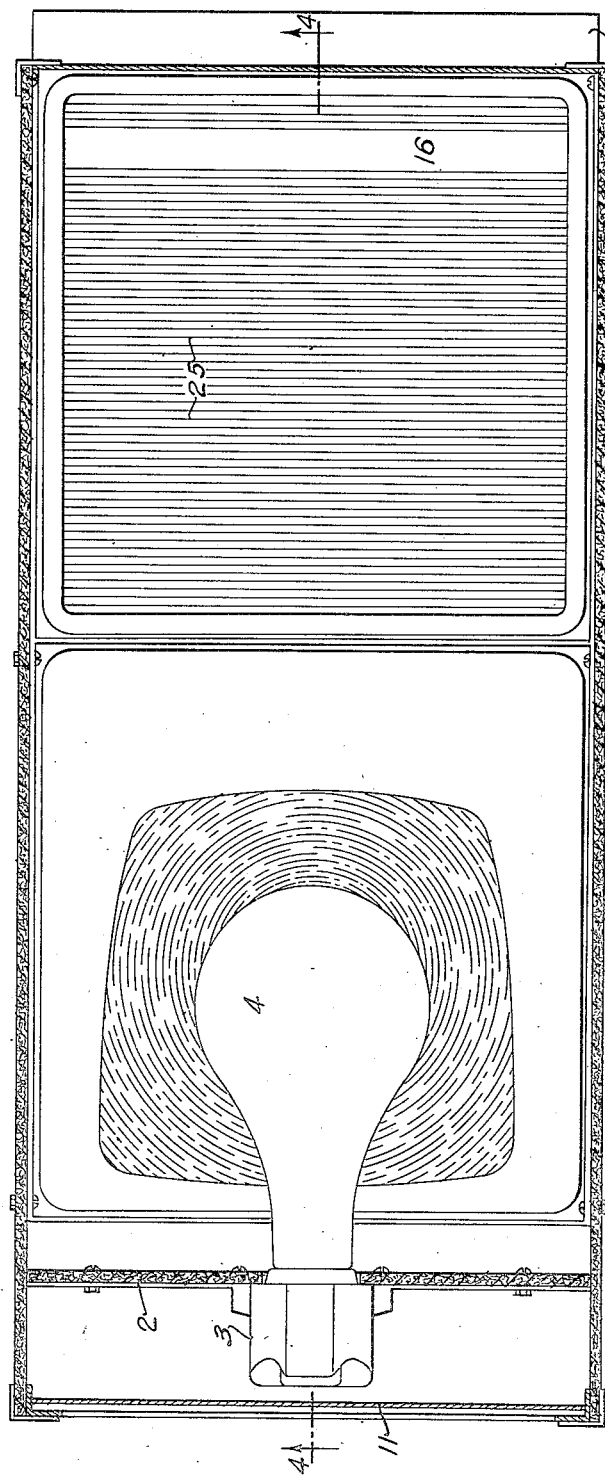
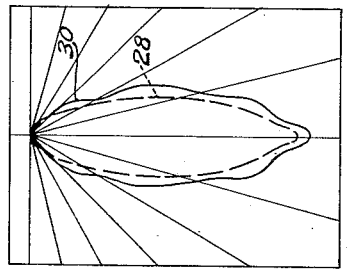
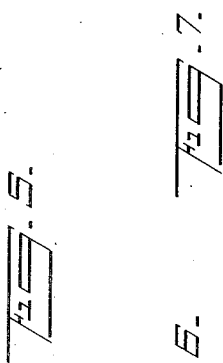
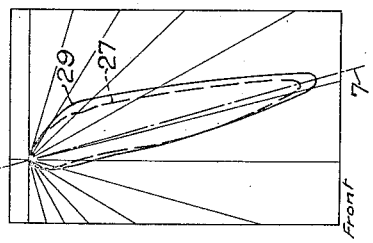
INVENTOR
William A. Dorey.
BY
Jacob Liberman
ATTORNEY Aug. 9, 1932. W. A. DOREY 1,870,241
LUMINAIR
Filed Aug. 14, 1931 5 Sheets-Sheet 4

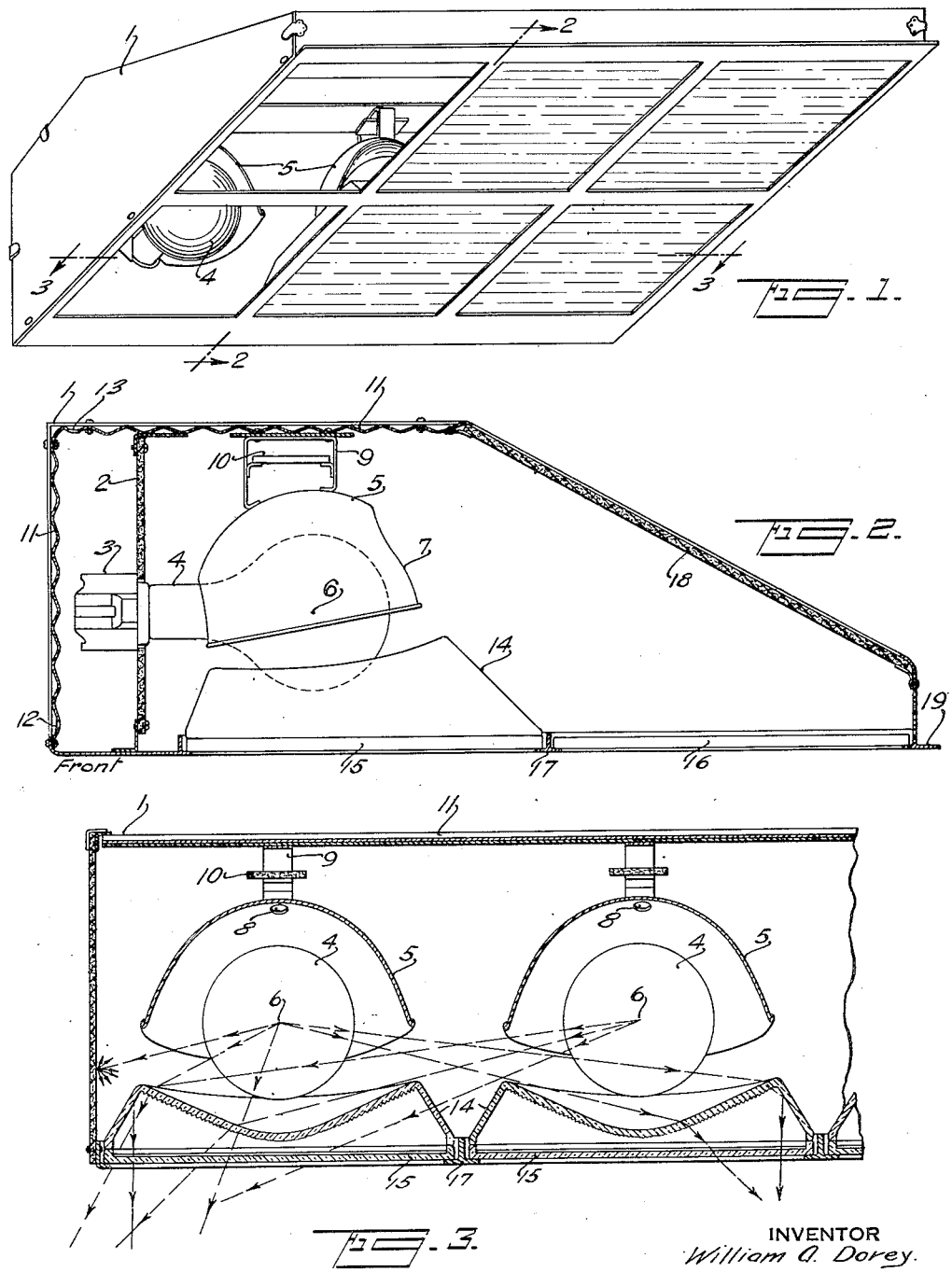

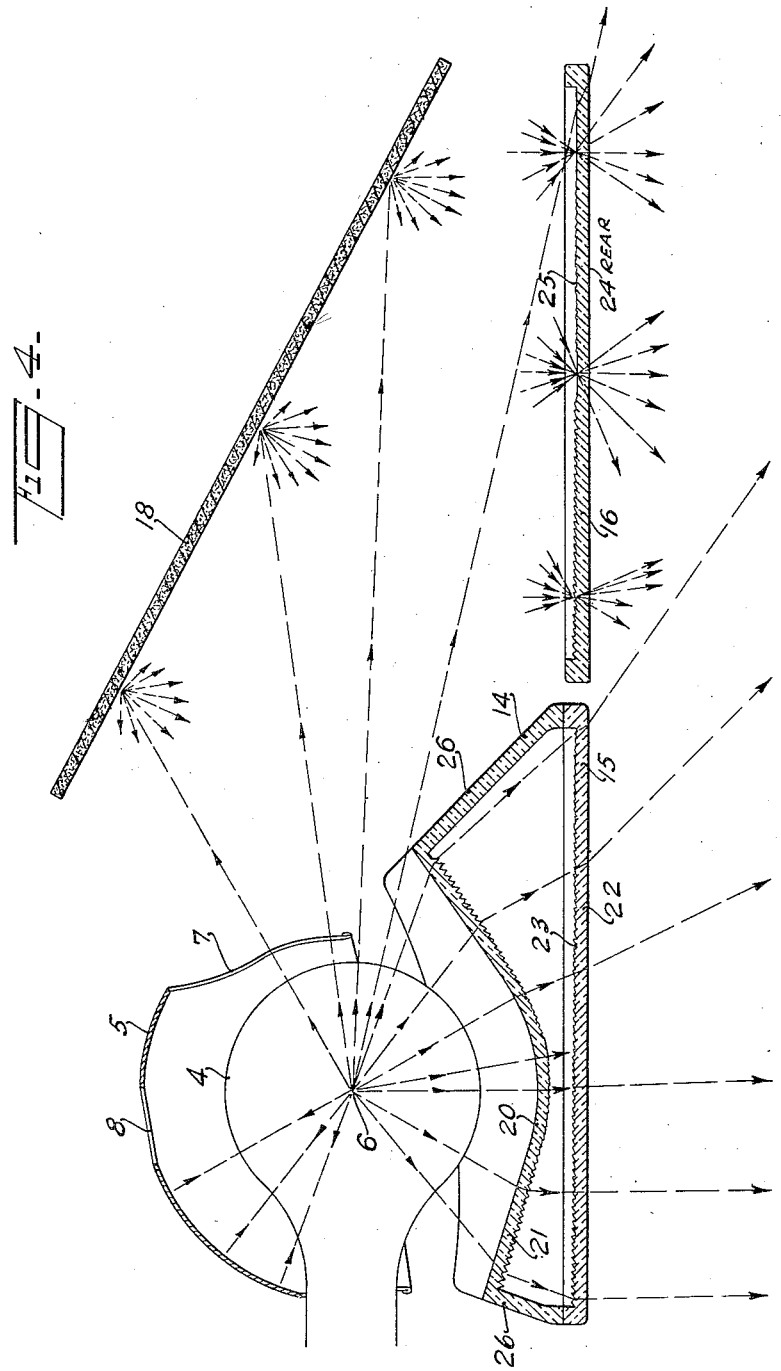

Direction of Travel

INVENTOR.
William A. Dorey
BY
ATTORNEY.

Aug. 9, 1932.  W. A. DOREY  1,870,241
LUMINAIR
Filed Aug. 14, 1931   5 Sheets-Sheet 5
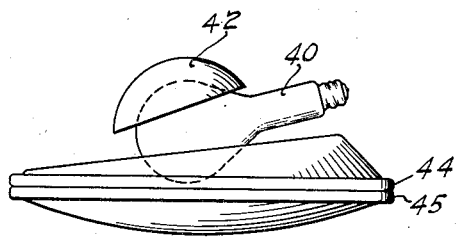
Fig. 12
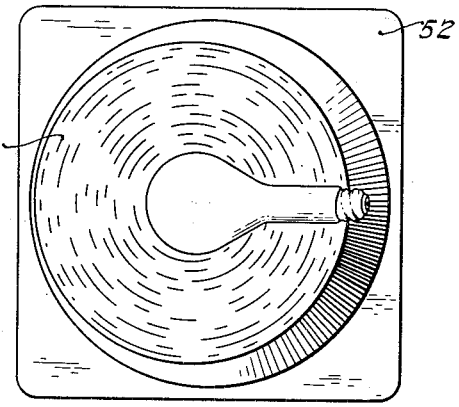
Fig. 13
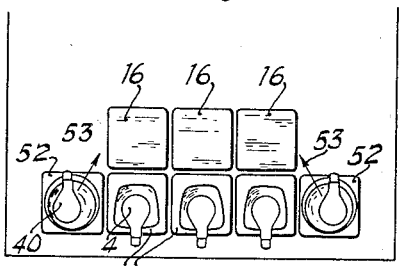
Fig. 14
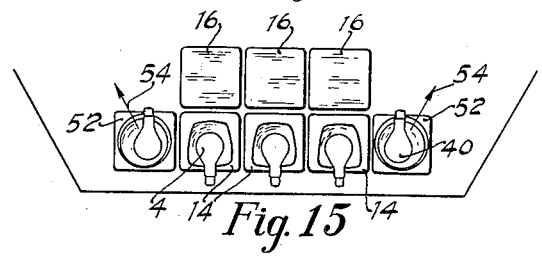
Fig. 15
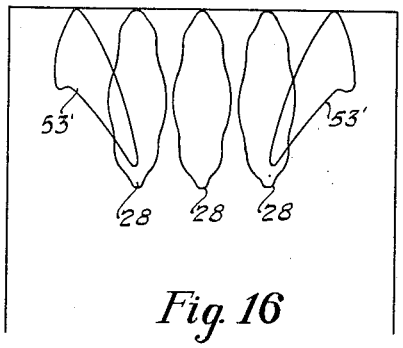
Fig. 16
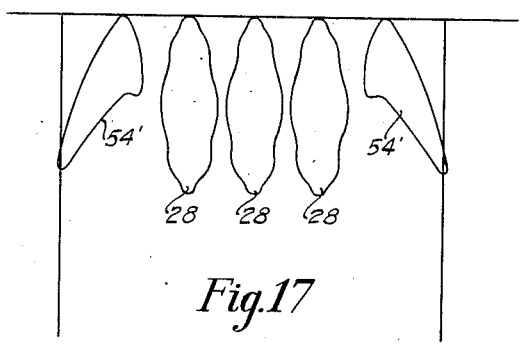
Fig. 17
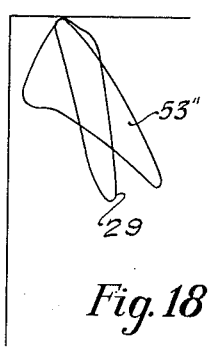
Fig. 18
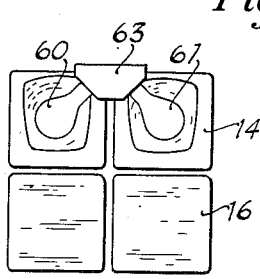
Fig. 20
Fig. 19
INVENTOR.
William A. Dorey.
BY
ATTORNEY.

Patented Aug. 9, 1932

1,870,241

UNITED STATES PATENT OFFICE

WILLIAM A. DOREY, OF NEWARK, OHIO, ASSIGNOR TO HOLOPHANE COMPANY, INC., OF NEW YORK, N. Y., A CORPORATION OF DELAWARE

LUMINAIR

Application filed August 14, 1931. Serial No. 556,963.

The present invention relates to luminairs especially designed for the lighting of show windows and tunnels, but suitable for use in various locations where the light distribution available is appropriate.

The present invention contemplates a lighting unit employing an incandescent lamp bulb as a light source and having a prismatic lens cover (usually mounted horizontally) adapted to receive downwardly directed light and concentrate it into a downwardly and obliquely slanting beam whose lateral spread is controlled by the prismatic formation of the cover. This lateral spread is moderately limited and the beam may be symmetrical in its median plane or may be asymmetric transversely.

An object of the present invention is to provide an improved construction of luminairs adapted to accommodate single light sources or a plurality of light sources mounted in a row in compact housings having substantially plane outer surfaces which may be placed flush with the ceilings or wall. The present invention is especially adapted for use with lamps of high candle power in the lighting of display windows in stores and in the lighting of vehicular tunnels. In the lighting of show windows it is good practice to mount the luminairs at or near the ceiling of the windows and close to the window glass and to redirect the light rays downward and inward to the objects on display.

When large light sources are used it is desirable to reduce the vertical depth of the luminairs to the least dimensions possible, to provide means for dissipating the heat generated, and to secure varying degrees of illumination intensity without making the illumination spotty. When the luminairs are recessed it is desirable that they should appear as a continuous multiple unit rather than as a row of separate units and it is also possible to increase efficiency by working towards this end.

In order to reduce the depth and secure compactness, it has been found to be preferable to place the lamps in a horizontal or substantially horizontal position and use spherical reflectors and flat reflecting surfaces in combination with refracting glasses.

In order to dissipate heat in the show window lighting luminairs, the lamp receptacles have been placed in separate ventilated compartments and corrugated metal has been provided as radiating surface for that part of the housing most exposed to heat.

In order to secure varying degrees of intensity without spoiling the quality of illumination, provision is made for a comparatively wide lateral distribution from each unit so that, if desired, every fifth unit in a system may be left burning so as to secure 20% of the full intensity possible without spoiling the uniformity of the lighting.

It is also possible to embody a complete single unit luminair in a self contained housing. When a multiple unit luminair is desired, the end pieces of the housing may be omitted and the separate optical units joined together so as to make a continuous multiple unit.

Where the luminairs are intended for the lighting of vehicular tunnels, they are designed to be mounted flush with the ceiling of the tunnel and arranged to project the light toward the roadway in the direction of travel so that high intensity illumination is possible without glare.

The accompanying drawings show, for purposes of illustrating the present invention, two of the many embodiments in which the invention may take form, it being understood that the drawings are illustrative of the invention rather than limiting the same.

In these drawings:

Fig. 1 is a perspective view of a multiple unit luminair for show window lighting;

Fig. 2 is a vertical cross section through plane 2—2 of Fig. 1;

Fig. 3 is a vertical cross section through plane 3—3 of Fig. 1;

Fig. 4 is a vertical cross section through plane 4—4 of Fig. 5;

Fig. 5 is a plan view of a single unit luminair;

Fig. 6 is a diagram showing the distribution of light intensity as in a transverse vertical plane through the lamp axis;

Fig. 7 is a diagram showing distribution of light intensities in a lateral plane;

Figure 8:
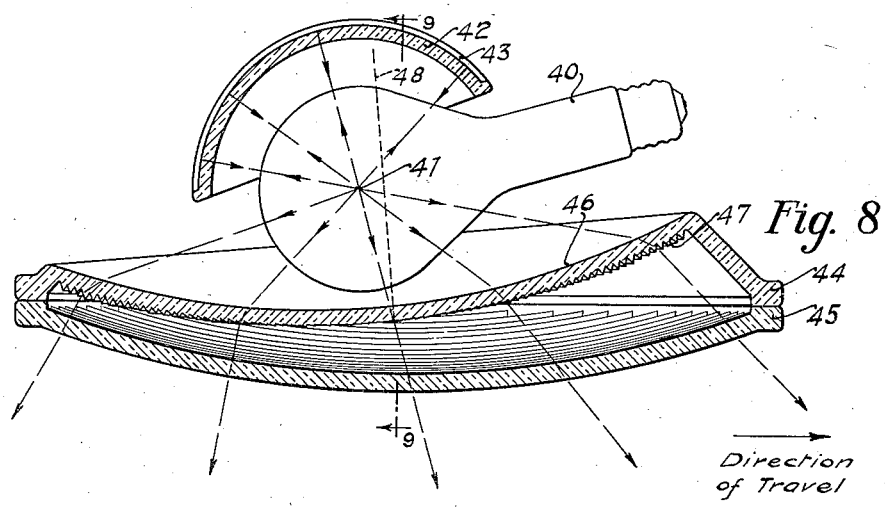
Fig. 8 is a sectional view through the light controlling part of a tunnel lighting luminair taken in the direction of travel, or on line 8—8 of Fig. 10.
Figure 10:
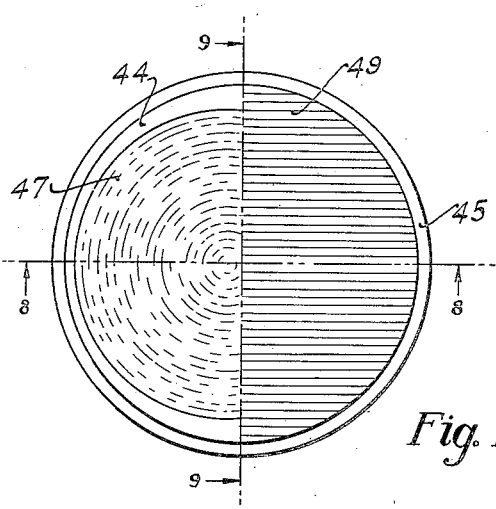
Figure 11:
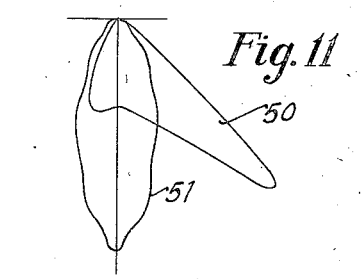

Fig. is a section on the line 9—9 of Figs. 8 and 10;

Fig. 10 is a top plan view of the lens system of the tunnel lighting luminair, the left portion of the figure showing the upper lens plate and the right portion of the figure showing the lower lens plate;

Fig. 11 is a diagram illustrating the distribution of light lengthwise of the tunnel and across the tunnel;

Fig. 12 is a side elevational view of the luminair of Figs. 8—11 inclusive;

Fig. 13 is a top plan view of a slightly modified form of luminair;

Figs. 14 and 15 are diagrammatic views illustrating show window installations employing luminairs of both forms;

Figs. 16, 17, and 18 illustrate light distribution from the arrangements of Figs. 14 and 15 respectively; and Figs. 19 and 20 are diagrammatic views of other arrangements for show window lighting luminairs.

Fig. 1 shows a multiple unit having three light sources and lens systems. For convenience in mounting and to improve the utilization of the light, the light sources and lens systems are all mounted in a single housing 1. This housing is adapted to be mounted with its lower face flush with the show window ceiling, with the part at the left side of Figure 2 adjacent the front of the window. A partition 2 divides the inside of the housing into a narrow front wiring chamber and a long rear chamber for the light controlling parts of the unit. This partition is preferably made of light diffusing material.

A socket 3 secured to the partition 2 supports a horizontal lamp bulb 4 with its light center at 6. Above the bulb there is preferably provided a spherical specular reflector 5 with its center at the center of the light source.

This reflector is cut away at 7 to allow light to escape rearwardly and to permit the insertion of the lamp. It is provided with a ventilating hole at 8, Fig. 3. The reflector is attached to the housing by means of the yoke 9 which also holds a baffle plate 10 inserted to prevent extreme local heating of the housing immediately above the lamp.

To facilitate the dissipation of heat, the upper and rear parts of the housing may be made of corrugated metal, as indicated at 11. The rear wall may be provided with holes 12 and 13 for purposes of ventilation.

The bottom of the housing is skeletonized, as indicated, to accommodate the prismatic glass whereby the light is collected and transmitted in desired directions. A two part lens system 14—15 is carried underneath the light source and a second refracting plate 16 is carried to the rear of the same.

The glasses 14 and 15 are sealed together and, together with glass 16, are supported by the flanged metal frame 17 which forms part of the lower surface of the housing. The upper rear part of the housing 18 is in the form of a flat diffuse reflecting surface preferably sloping, as indicated. A flange 19 is furnished at the inner edge of the housing so that it may form a rail to support the glass 16.

Referring to Figs. 4 and 5, these show the optical features of the design in greater detail. The refracting glass 14 is dished and has a smooth upper surface 20 and a lower surface 21 provided with concentric prisms adapted to give a moderate concentration to light rays received directly from the source 6 and indirectly from the reflector 5. The course of typical light rays is shown. The glass plate 15 has a smooth lower surface 22 and an inner surface 23 provided with parallel refracting prisms which do not change the lateral direction of light rays they receive but, in part, concentrate the light rays longitudinally and, in part, spread them out toward the back of the window, as indicated by the diagrams of typical light rays shown in Fig. 4. In order to join the refracting glasses 14 and 15, glass 14 is provided with pyramidal smooth transparent glass sides 26 which extend down to meet the outer edges of the glass plate 15. These lens parts are cemented together.

Referring to Fig. 4, the light rays passing through the opening 7 are caught by the diffuse reflector 18 and to a large extent reflected down on to refracting glass 16. Refracting glass 16 has a smooth outer surface 24 and an inner surface 25 provided with parallel refracting prisms which do not change the lateral direction of the light rays received but change their direction longitudinally, as indicated in the diagram.

Figs. 4 and 5 show a single light unit with a lower surface consisting of two squares of glass. In some cases, where it is desirable to still further reduce the size of the luminair, the plate 16 and the reflector 18 are omitted and a rectangular housing is constructed to support the glasses 14 and 15 and the lamp and reflector in the relations indicated.

Fig. 6 shows the distribution of intensity from these luminairs in a vertical plane through the lamp axis. Fig. 7 shows similar distributions of intensity in the lateral plane 7—7 of Fig. 6. Each one of these charts shows two distribution curves. In Fig. 6, 27, and in Fig. 7, 28, show the results secured with a single light unit in which the secondary glass plate 16 and reflector 18 have been omitted. Curve 29, Fig. 6, and 30, Fig. 7, show the results secured with a three light multiple unit such as is shown in Fig. 1 when the central lamp only is burning. The difference between curves 27 and 29 in Fig. 6 show, in general, the advantage to be obtained by using the secondary plate 16 and the flat diffuse reflector 18. Referring to Fig. 7, the gain shown in curve 30, as compared to curve 28, is due largely to light emitted from one lamp to the glasses provided primarily for the next adjacent lamps. This action is illustrated by means of typical light rays in Fig. 3.

In the tunnel lighting luminair of Figs. 8-12 inclusive, the optical arrangement is quite similar to that previously described for the window lighting luminair. The tunnel lighting luminair is designed to be mounted in the ceiling of the tunnel with the bottom of the lens approximately flush with the ceiling. The luminair can be made shallow so that it will not project upwardly above the ceiling into the ventilating duct to any great extent. These units will be located in a row or rows over the pavement of the tunnel and are designed to afford strong illumination to the pavement and to vehicles in the tunnel. Inasmuch as vehicular tunnels are designed so that each tunnel carries traffic in a single direction, it is possible to greatly improve the lighting of the tunnels by so arranging the luminairs that the light is projected obliquely downwardly in the direction of travel. This avoids subjecting the driver to glare.

In the tunnel lighting luminair the light source is in the form of a lamp bulb indicated at 40. This lamp bulb may be mounted on a horizontal axis, but is preferably mounted on an axis slightly inclined to the horizontal as indicated, for this permits making a more compact unit. This unit will preferably have a wiring chamber carrying the socket and a large chamber to accommodate the lamp bulb reflector and lenses, but for clearness in the drawings, the housing or box in which the luminair is carried in the ceiling of the tunnel is omitted.

Figure 9:
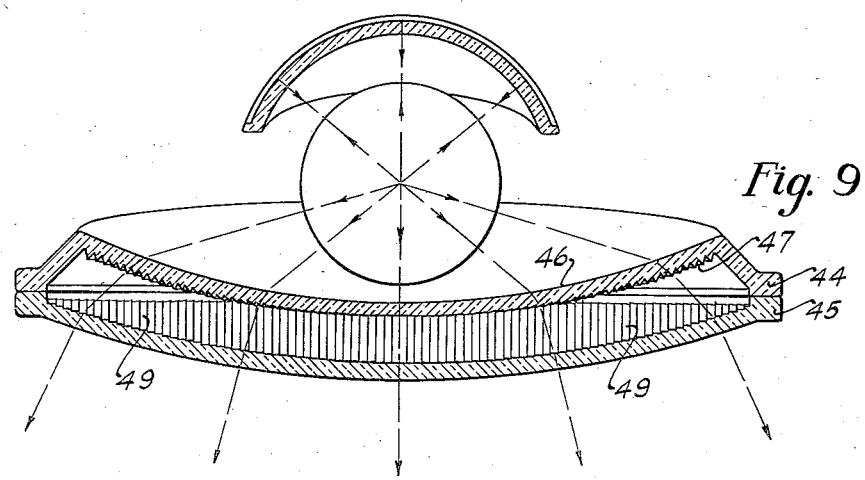

The center of the light source is indicated at 41 and above this light source is placed a spherical reflector 42 with its center at the light source. It is preferably made of glass and provided with totally reflecting prisms 43. The lens cover is made of two parts of glass 44 and 45 which in a general way resemble the glass parts 14 and 15, but as these luminairs are intended for isolated mounting, they are preferably made round instead of square. The upper lens plate 44 has a dished central portion 46 provided with circular light concentrating prisms 47 on its lower surface. The axis of these prisms is inclined rearwardly as indicated by the line 48. The lower lens plate 45, while substantially flat, is preferably downwardly dished to a slight extent. It is provided with internally disposed prisms 49 preferably parallel with the plane of offset and which may be symmetrical on opposite sides of the plane of offset, or asymmetrical, if desired.

Where the beam is to be symmetrical in lateral planes, a symmetrical lower plate is used and the light source 41 is placed in the vertical plane 8—8 of Fig. 10 and is offset to the rear of the lens axis 48 as indicated in Figs. 8 and 9. The reflector 42 acts to return the upwardly emitted light toward the light source and this reflected light and substantially all the downwardly directed light fall on the lens plate 44. This lens plate serves to concentrate the light as indicated in the drawings and to direct it on to the lower lens plate 45. The prisms of this lower lens plate act to condense the light in lateral planes but do not materially affect the direction of the light rays in planes lengthwise of the prisms. Hence the light will be emitted in a downwardly obliquely slanting beam whose lateral spread is controlled by the prismatic formation of the lens cover.

Fig. 11 shows the curves of light distribution. The curve 50 represents the light distribution lengthwise of the tunnel or in the plane 8—8 of Fig. 10, while curve 51, taken through the plane of maximum candle power, indicates the distribution of light laterally of the unit, in the plane 9—9 of Fig. 10, or across the tunnel. It will be noted from Fig. 11 that a very strong beam of light is projected on to the roadway in the direction of travel and that comparatively little light is directed toward the eye of the driver and that the character of the light distribution is such as will give substantially uniform illumination on the surface of the roadway.

In the construction shown in Figs. 8 and 9, the light source is offset from the lens axis to the rear only so that it produces a beam laterally symmetric but asymmetric in the direction of travel. But, if it is desired to obtain an asymmetric distribution in lateral planes, one can shift the light source to the right or left in Fig. 9 so as to shift the diagrams of lateral light distribution to the left or right as desired. This latter arrangement may be employed where it is desired to more strongly illuminate one side of the roadway than the other, as for example in more strongly illuminating the curbing.

The luminair shown in Fig. 13 is the same as that shown in Figs. 8–12 except that it is provided with square flanges 52 instead of circular flanges as shown in the other figures.

Figs. 14 and 15 illustrate diagrammatical layouts for special window lighting installations of the window lighting units of Figs. 1–7 and tunnel lighting units of the type shown in Figs. 7–13. The shape of the show window is indicated by the lines partially enclosing the luminairs. Three of the window lighting units are indicated and square form tunnel lighting units are shown at 52. In Fig. 14 the light sources for the side units are offset from the lens axis laterally so as to converge their beams as indicated by the arrows 53. In Fig. 15 the units 52 are arranged to diverge their light beams as indicated at 54. The arrangement in Fig. 14 will be employed where it is desired to more strongly illuminate a central display or to keep light off the sides of the window, or away from an entrance. The arrangement shown in Fig. 15 may be employed where one desires to increase the spread of light. The light distribution along the lines 53 and 54 of Figs. 14 and 15 is indicated in Figs. 16 and 17 by the curves 53' and 54'.

Fig. 18 illustrates the light distribution from the units of Fig. 14 or 15 in a plane at right angles to the plane of Figs. 16 and 17.

Figs. 19 and 20 illustrate slightly modified forms of construction showing different ways of supporting the light sources for two show window lighting units of the type shown in Fig. 5. In Fig. 19 the lamps 60 and 61 are supported from a double lamp socket 62 carried between the luminairs, while in Fig. 21 the lamps 60 and 61 are carried by a cluster socket 63.

The present application is, as to common subject matter, a continuation of application Serial No. 413,199, filed December 11, 1929.

It is obvious that the invention may be embodied in many forms and constructions, and I wish it to be understood that the particular forms shown are but a few of the many forms. Various modifications and changes being possible, I do not otherwise limit myself in any way with respect thereto.

I claim:

1. A lighting unit having a closed housing provided with a vertical partition near one side wall for dividing the housing into a small chamber for wiring and a large chamber for the light source, a socket carried by the partition, an incandescent lamp bulb carried by the socket and projecting into the large chamber, and a prismatic lens cover forming the bottom of the large chamber, the lens cover being adapted to receive downwardly directed light and concentrate it into a downwardly and obliquely slanting beam whose lateral spread is controlled by the prismatic formation of the lens cover.

2. A lighting unit having a closed housing provided with a vertical partition near one side wall for dividing the housing into a small chamber for wiring and a large chamber for the light source, a socket carried by the partition, an incandescent lamp bulb carried by the socket and projecting into the large chamber, and a prismatic lens cover forming the bottom of the large chamber, the lens cover having concentrating prisms whose axis intersects the light source and laterally extending parallel prisms opposed to the concentrating prisms, the lens cover being adapted to receive downwardly directed light and concentrate it into a downwardly and obliquely slanting beam symmetrical in its median plane and of moderately limited lateral spread.

3. A lighting unit having a closed housing provided with a vertical partition near one side wall for dividing the housing into a small chamber for wiring and a large chamber for the light source, a socket carried by the partition, an incandescent lamp bulb carried by the socket and projecting into the large chamber, and a prismatic lens cover forming the bottom of the large chamber, the lens cover having annular concentrating prisms whose axis is offset from the light source and prisms opposed to the annular prisms and substantially parallel to the plane of offset, the lens cover being adapted to receive downwardly directed light and concentrate it into a downwardly and obliquely slanting beam asymmetric relative to the plane of offset.

4. A lighting unit having a closed housing provided with a laterally extending vertical partition near the front wall for dividing the housing into a narraw front chamber for wiring and a long rear chamber for the light source, a socket carried by the partition, an incandescent lamp bulb carried by the socket and projecting into the rear chamber, and a prismatic lens cover forming the bottom of the rear chamber, the lens cover being adapted to receive downwardly directed light and concentrate it into a downwardly and rearwardly slanting beam of moderately limited lateral spread.

5. A lighting unit having a closed housing provided with a heat dissipating top wall and a vertical partition near one side wall for dividing the housing into a narrow front chamber for wiring and a long chamber for the light source, a socket carried by the partition, an incandescent lamp bulb carried by the socket and projecting into the second chamber, and a prismatic lens cover forming the bottom of the second chamber, the lens cover being adapted to receive downwardly directed light and concentrate it into a downwardly and obliquely slanting beam whose lateral spread is controlled by the prismatic formation of the lens cover.

6. A lighting unit having a closed housing provided with a vertical partition near one side wall for dividing the housing into a small chamber for wiring and a large chamber for the light source, the front chamber having vented walls, a socket carried by the partition, an incandescent lamp bulb carried by the socket and projecting into the large chamber, and a prismatic lens cover forming the bottom of the large chamber, the lens cover being adapted to receive downwardly directed light and concentrate it into a downwardly and obliquely slanting beam whose lateral spread is controlled by the prismatic formation of the lens cover.

7. A lighting unit having a closed housing, a substantially horizontal lamp socket therein, an incandescent lamp bulb carried by the socket, a spherical reflector disposed above the lamp bulb and adapted to return light toward the light source, and a prismatic lens cover forming the bottom of the housing, the lens cover being adapted to receive downwardly directed light from a comparatively large solid angle and concentrate it into a downwardly and obliquely slanting beam whose lateral spread is controlled by the prismatic formation of the lens cover.

8. A lighting unit having a closed housing, a substantial horizontal lamp socket therein, an incandescent lamp bulb carried by the socket, a spherical reflector disposed above the lamp bulb and adapted to return light toward the light source, and a prismatic lens cover forming the bottom of the housing, the lens cover having concentrating prisms whose axis intersects the light source and laterally extending parallel prisms opposed to the concentrating prisms, the lens cover being adapted to receive downwardly directed light from a comparatively large solid angle and concentrate it into a downwardly and obliquely slanting beam symmetrical in its transverse median plane and of moderately limited lateral spread.

9. A lighting unit having a closed housing, a substantially horizontal lamp socket therein, an incandescent lamp bulb carried by the socket, a spherical reflector disposed above the lamp bulb and adapted to return light toward the light source, and a prismatic lens cover forming the bottom of the housing, the lens cover having annular concentrating prisms whose axis is offset from the light source and prisms opposed to the annular prisms and substantially parallel to the plane of offset, the lens cover being adapted to receive downwardly directed light from a comparatively large solid angle and concentrate it into a downwardly and obliquely slanting beam asymmetric relative to the plane of offset.

10. A lighting unit having a closed housing, a horizontal lamp socket therein, an incandescent lamp bulb carried by the socket and projecting rearwardly, a spherical reflector disposed above the lamp bulb and adapted to return light toward the light source, a prismatic lens cover forming the bottom of the housing, the lens cover being adapted to receive downwardly directed light from a comparatively large solid angle and concentrate it into a downwardly and rearwardly slanting beam of moderately limited lateral spread.

11. A lighting unit having a closed housing, a substantially horizontal lamp socket therein, an incandescent lamp bulb carried by the socket and projecting rearwardly, a spherical metal reflector secured to the top wall of the housing and apertured to permit the escape of heated air from about the bulb, the reflector being adapted to return light toward the light source, and a prismatic lens cover forming the bottom of the housing, the lens cover being adapted to receive downwardly directed light from a comparatively large solid angle and concentrate it into a downwardly and obliquely slanting beam whose lateral spread is controlled by the prismatic formation of the lens cover.

12. A lighting unit having a closed housing, a lamp socket therein, an incandescent lamp bulb carried by the socket with its axis at an angle to the horizontal, a spherical reflector above the light source with its center at the light source, and a prismatic lens cover forming the bottom of the housing, the lens cover having annular concentrating prisms whose axis is at a slight angle to the vertical and prisms opposed to the annular prisms and substantially parallel to the plane of offset, the lens cover being adapted to receive downwardly directed light from a comparatively large solid angle and concentrate it into a downwardly and obliquely slanting beam asymmetric relative to the plane of offset.

13. A lighting unit having a closed housing, a substantially horizontal lamp socket therein, an incandescent lamp bulb carried by the socket, a reflector disposed above the lamp bulb and adapted to return light downwardly, and a two-part prismatic lens cover forming the bottom of the housing, the lower part being horizontal and substantially flat and the upper part dished to accommodate the bulb, the lens cover being adapted to receive downwardly directed light from a comparatively large solid angle and concentrate it into a downwardly and obliquely slanting beam whose lateral spread is controlled by the prismatic formation of the lens cover.

14. A lighting unit having a closed housing, a substantially horizontal lamp socket therein, an incandescent lamp bulb carried by the socket, a reflector disposed above the lamp bulb and adapted to return light downwardly, and a two-part prismatic lens cover forming the bottom of the housing, the lower part having laterally extending parallel prisms and being horizontal and substantially flat and the upper part dished to accommodate the bulb and having concentrating prisms whose axis intersects the light source, the lens cover being adapted to receive downwardly directed light from a comparatively large solid angle and concentrate it into a downwardly and obliquely slanting beam symmetrical in its transverse median plane and of moderately limited lateral spread.

15. A lighting unit having a closed housing, a substantially horizontal lamp socket therein, an incandescent lamp bulb carried by the socket, a spherical reflector disposed above the light source with its center at the light source, and a two-part prismatic lens cover forming the bottom of the housing, the lower part having parallel prisms and being horizontal and substantially flat and the upper part dished to accommodate the bulb and having annular concentrating prisms whose axis is offset from the light source, the lens cover being adapted to receive downwardly directed light from a comparatively large solid angle and concentrate it into a downwardly and obliquely slanting beam asymmetric relative to the plane of offset.

16. A lighting unit having a closed housing, a horizontal lamp socket therein, an incandescent lamp bulb carried by the socket and projecting rearwardly, a reflector disposed above the lamp bulb and adapted to return light downwardly, and a two-part prismatic lens cover forming the bottom of the housing, the lower part being flat and the upper part dished to accommodate the bulb, the lens cover being adapted to receive downwardly directed light from a comparatively large solid angle and concentrate it into a downwardly and rearwardly slanting beam of moderately limited lateral spread.

17. A lighting unit having a closed housing, a substantially horizontal lamp socket therein, an incandescent lamp budb carried by the socket, a spherical reflector disposed above the lamp bulb and adapted to return light downwardly, and a two-part prismatic lens cover forming the bottom of the housing, the lower part being horizontal and substantially flat and the upper part dished to accommodate the bulb, the lens cover being adapted to receive downwardly directed light from a comparatively large solid angle and concentrate it into a downwardly and obliquely slanting beam whose lateral spread is controlled by the prismatic formation of the lens cover, the lower edge of the reflector being above the upper lens part to permit high angle light to escape laterally.

18. A lighting unit having a closed housing, a substantially horizontal lamp socket therein, an incandescent lamp bulb carried in the socket and projecting rearwardly, the rear portion of the roof of the housing sloping downwardly and being composed of diffusing material, a reflector disposed above the light source and adapted to return light downwardly, the rear of the reflector being open to permit direct light to fall on the sloping diffusing wall, and a prismatic lens cover in two sections and forming the bottom of the rear of the housing, the rear section receiving light diffused by the sloping roof and transmitting it downwardly and rearwardly, the front lens section being under the light source and reflector and acting on direct and reflected light to concentrate it into a downwardly and rearwardly slanting beam of moderately limited lateral spread.

19. A lighting unit having a closed housing, a substantially horizontal lamp socket therein, an incandescent lamp bulb carried in the socket and projecting rearwardly, the rear portion of the roof of the housing sloping downwardly and being composed of diffusing material, a reflector disposed above the light source and adapted to return light downwardly, the rear of the reflector being open to permit direct light to fall on the sloping diffusing wall, and a prismatic lens cover in two sections and forming the bottom of the rear of the housing, the rear section receiving light diffused by the sloping roof and transmitting it downwardly and rearwardly, the front lens section being under the light source and reflector and being composed of two glass parts, the lower of which is substantially flat, while the upper glass part is dished to accommodate the bulb, said last mentioned glass parts having opposed prisms adapted to act on direct and reflected light to concentrate it into a downwardly and rearwardly slanting beam of moderately limited lateral spread.

20. A lighting apparatus for providing downwardly and rearwardly directed light with comparatively wide spread laterally, comprising, a plurality of light sources regularly and laterally spaced in a closed housing, a reflector for each light source, a plurality of prismatic lens covers mounted side by side in the bottom of the housing, each lens cover being placed under a light source and adapted to act on direct light therefrom and reflected light from the corresponding reflector to concentrate said light into a downwardly and rearwardly slanting beam of moderately limited lateral spread, the lens sections being shaped to permit stray light from adjacent light sources to pass through the same without materially condensing the same laterally but bending them rearwardly.

21. A luminair comprising a light source and a lens underneath the light source, the lens consisting of two refracting glass parts, the lower of which is in the form of a substantially flat plate, while the upper is spaced a substantial distance above the lower and dished to receive the lamp bulb.

22. A luminair comprising a light source, a reflector form above the light source, and a lens underneath the light source, the lens consisting of two refracting glass parts, the lower of which is in the form of a substantially flat plate, while the upper is spaced a substantial distance above the lower and dished to receive the lamp bulb.

23. A luminair comprising a light source, a spherical reflector form above the light source and having its center at the light source, and a lens underneath the light source, the lens consisting of two refracting glass parts, the lower of which is in the form of a substantially flat plate, while the upper is spaced a substantial distance above the lower and dished to receive the lamp bulb.

24. A luminair comprising a light source and a lens underneath the light source, the lens consisting of two refracting glass parts, the lower of which is in the form of a substantially flat plate, while the upper is spaced a substantial distance above the lower and dished to receive the lamp bulb, the dished part having circular prisms to concentrate direct light onto the plate, the plate having laterally extending prisms adapted to direct the light obliquely downwardly.

25. A luminair comprising a light source and a lens underneath the light source, the lens consisting of two refracting glass parts, the lower of which is in the form of a substantially flat plate, while the upper is spaced a substantial distance above the lower and dished to receive the lamp bulb, the dished part having circular prisms whose axis intersects the light source for symmetrically concentrating direct light onto the plate, the plate having laterally extending prisms adapted to direct the light obliquely downwardly without changing its lateral spread.

26. A luminair comprising a light source and a lens underneath the light source, the lens consisting of two refracting glass parts, the lower of which is in the form of a substantially flat plate, while the upper is spaced a substantial distance above the lower and dished to receive the lamp bulb, the dished part having circular prisms whose axis is offset from the light source for asymmetrically concentrating direct light onto the plate, the plate having substantially parallel prisms adapted to direct the light downwardly and obliquely.

27. A luminair comprising a light source, a spherical reflector form above the light source, and a lens underneath the light source, the lens consisting of two refracting glass parts, the lower of which is in the form of a horizontal plate, while the upper is spaced a substantial distance above the lower and dished to receive the lamp bulb, the dished part having circular prisms to concentrate direct light onto the plate, the plate having laterally extending prisms adapted to direct the light obliquely downwardly.

28. A luminair comprising a light source, a two part lens system underneath the light source, the upper part including a dished central portion adapted to accommodate the light source and provided with prisms to concentrate light received thereby into a diverging beam, and a lower prismatic plate of larger area than the prismatic portion of the upper part and adapted to receive light therefrom and transmit it obliquely downwardly without materially changing the lateral spread.

29. A luminair comprising a light source, a two part lens system underneath the light source, the upper part including a dished central portion adapted to accommodate the light source and provided with concentric prisms whose axis coincides with the light source for concentrating light received thereby into a diverging beam symmetrical with respect to a transverse axis, and a lower prismatic plate of larger area than the prismatic portion of the upper part and adapted to receive light therefrom and transmit it obliquely downwardly without materially changing the lateral spread.

30. A luminair comprising a light source, a two part lens system underneath the light source, the upper part including a dished central portion adapted to accommodate the light source and provided with concentric prisms whose axis is offset from the light source for concentrating light received thereby into a diverging asymmetric oblique beam, and a lower prismatic plate of larger area than the prismatic portion of the upper part and adapted to receive light therefrom and transmit it obliquely downwardly without materially changing the lateral spread.

31. A luminair comprising a light source, a two part lens system underneath the light source, the upper part including a dished central portion adapted to accommodate the light source and provided with prisms to concentrate light received thereby into a diverging beam, and a lower prismatic plate of larger area than the prismatic portion of the upper part and adapted to receive light therefrom and transmit it obliquely downwardly without materially changing the lateral spread, the upper part having diverging walls extending toward and meeting the lower plate to form a closed envelope.

32. A luminair comprising a light source, a two part lens system underneath the light source, the upper part including a dished central portion adapted to accommodate the light source and provided with prisms to concentrate light received thereby into a diverging beam, and a lower prismatic plate of larger area than the prismatic portion of the upper part and adapted to receive light therefrom and transmit it obliquely downwardly without materially changing the lateral spread, the upper part having diverging walls extending toward and meeting the lower plate to form a closed envelope, these walls being so disposed as to intercept the fringe of the beam from the upper part.

33. A luminair comprising a plurality of regularly spaced light sources; a two part lens system under each light source, each lens system consisting of an upper part having prisms to concentrate light received thereby into a diverging beam, and a lower horizontal prismatic plate spaced a substantial distance below the upper lens part and of larger area to receive the light from the upper lens part and transmit it downwardly and rearwardly without materially changing the lateral spread, the spacing of the lens parts permitting light at high angles from one light source to pass between the lens parts underneath and adjacent light source and fall on the lower lens part which bends it rearwardly without affecting its spread laterally.

34. A luminair comprising a plurality of regularly spaced light sources; a two part lens system under each light source, each lens system consisting of an upper part having prisms to concentrate light received thereby into a diverging beam, and a lower horizontal prismatic plate spaced a substantial distance below the upper lens part and of larger area to receive the light from the upper lens part and transmit it downwardly and rearwardly without materially changing the lateral spread, the upper lens part having diverging translucent walls extending toward and meeting the lower plate to form a closed envelope, the translucent walls being adapted to receive high angle direct light from an adjacent light source and transmit it onto the lower plate which bends it rearwardly without affecting its spread laterally.

35. A luminair comprising a plurality of regularly spaced light sources; a two part lens system under each light source, each lens system consisting of an upper part dished to accommodate the light source and having prisms to concentrate light received thereby into a divergent beam, and lower horizontal prismatic plate spaced a substantial distance below the upper lens part and of larger area to receive the light from the upper lens part and transmit it downwardly and rearwardly without materially changing the lateral spread, the dished upper lens part of one lens system being adapted to receive high angle direct light from an adjacent light source and redirect it at a lowered angle to the lower plate which transmits it rearwardly without further change of its spread laterally.

36. A luminair comprising, a light source, a main lens system below the light source to receive the major portion of the downwardly emitted light and concentrate it into a downwardly and rearwardly directed beam of moderate lateral spread, a diffuse reflector above and to the rear of the light source and main lens system, and an auxiliary lens below the diffuse reflector to receive light therefrom and bend it generally in a rearward direction.

Signed at Asheville, in the county of Buncombe and State of N. Carolina, this 4th day of August, 1931.

WILLIAM A. DOREY.